(No Model.)

W. C. & J. A. PAUL.
THRUST BLOCK FOR SHAFTS.

No. 491,584. Patented Feb. 14, 1893.

WITNESSES:
A. Schehl.
Wm. Schulz.

INVENTORS
W. C. Paul &
BY J. A. Paul
Roeder & Briesen
ATTORNEYS.

UNITED STATES PATENT OFFICE.

WILLIAM C. PAUL AND JOHN A. PAUL, OF JERSEY CITY, NEW JERSEY.

THRUST-BLOCK FOR SHAFTS.

SPECIFICATION forming part of Letters Patent No. 491,584, dated February 14, 1893.

Application filed August 10, 1892. Serial No. 442,663. (No model.)

*To all whom it may concern:*

Be it known that we, WILLIAM C. PAUL and JOHN A. PAUL, both of Jersey City, Hudson county, New Jersey, have invented an Improved Thrust-Block for Shafts, of which the following is a specification.

This invention relates to a thrust block designed for preventing the longitudinal pressure exerted upon the shaft of a screw propeller by the water, from being transmitted to the crank shaft. Our improved thrust block is made in the form of a ball bearing, which greatly reduces the friction and consequently economizes power to a considerable extent.

Figure 1:
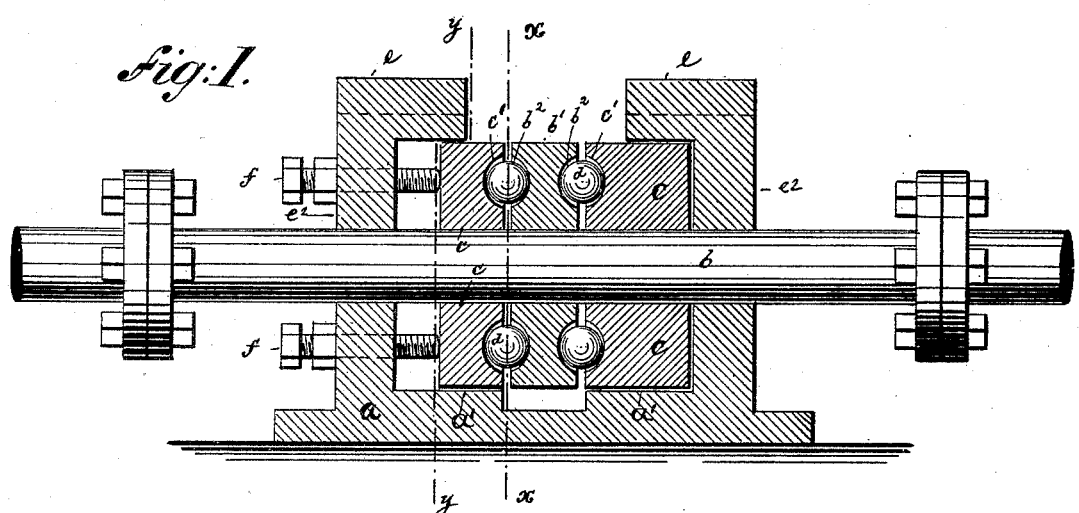
Figure 2:
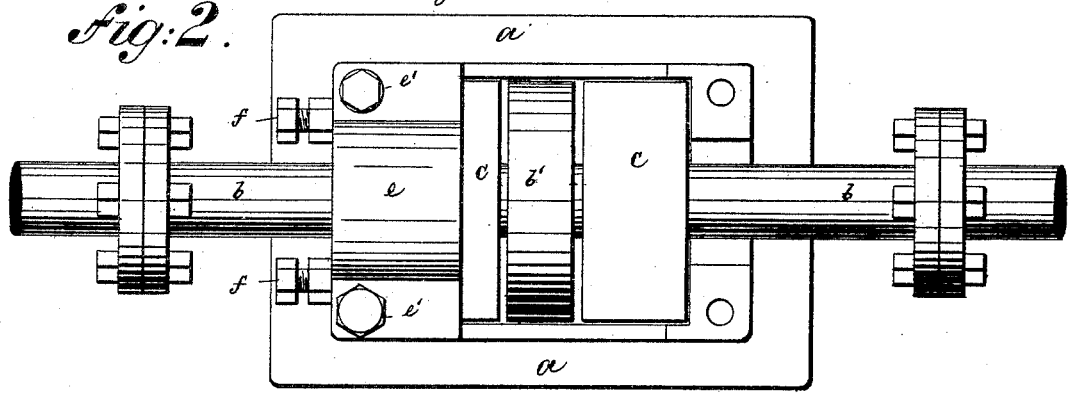
Figure 3:
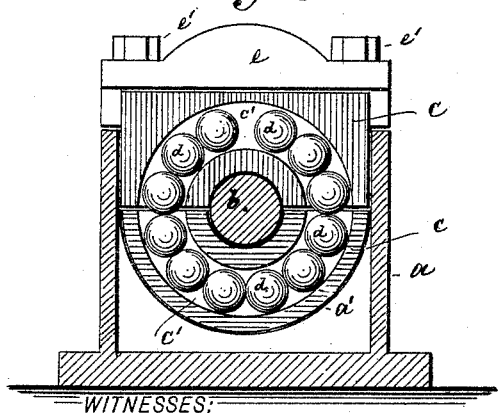
Figure 4:
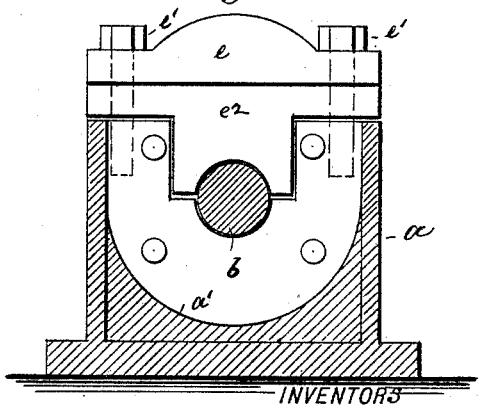

In the accompanying drawings: Figure 1 is a longitudinal section of our improved thrust block. Fig. 2 a top view thereof with one of the covers removed and with the balls omitted. Fig. 3 a cross section on line $x$, $x$ Fig. 1. and Fig. 4 a cross section on line $y$, $y$, Fig. 1.

The letter $a$ represents a base piece the ends of which are slotted centrally and provided with a semicircular bearing surface at the base of the slot, for the reception of shaft $b$. This shaft carries at one end the propeller and is at the other end driven by the crank shaft as usual. Centrally within the base piece $a$, the shaft $b$ is provided with a collar $b'$, having an annular groove $b^2$, in each of its sides. Opposite to the collar $b'$, the base piece $a$ contains a pair of sectional disks or bearings $c$, provided with grooves $c'$, corresponding to and facing the grooves $b^2$. Within the grooves $b^2$, $c'$, there is contained a series of balls $d$, which when the shaft $b$ revolves, will revolve with it, as will be readily understood. The disks $c$, are divided on their horizontal diameters (Fig. 3) so that they can be properly placed in position, above and below the shaft.

The lower section of each disk is seated upon a curved shoulder $a'$, of base piece $a$. The upper section of each disk is held down upon the lower section by a cover $e$, secured to the base piece by screws $e'$. Each of the covers $e$ is made L shaped, being provided with a downwardly projecting central lug $e^2$, that fits into the slot of the end pieces. The lower edge of lug $e^2$ is provided with a semicircular bearing to embrace the upper half of the shaft. Thus while the horizontal section of the cover holds down the disk, the vertical section holds down the shaft, to prevent unequal pressure upon the balls in case of unequal strain upon the shaft.

To permit lateral adjustment of the disks $c$, screws $f$ are tapped through one side of the base piece, which bear against one set of the sectional disks.

In use, the longitudinal pressure upon the shaft in either direction (going ahead or astern) will be transmitted to the balls $d$, that will thus bear against the front or rear disk $c$. But as the balls revolve with the shaft, the friction is by far less than with thrust blocks in which the collar on the shaft frictions directly against the disk.

What we claim is:

The combination of the slotted base piece, a shaft, a grooved collar thereon, grooved disks, one adjustable relatively to the collar, balls in the grooves, an L shaped cover projecting over each disk, and adjusting means bearing against one of the disks, substantially as specified.

W. C. PAUL.
JOHN A. PAUL.

Witnesses:
A. JONGHMANS,
F. V. BRIESEN.